United States Patent [19]

Ochi

[11] Patent Number: 5,432,299

[45] Date of Patent: Jul. 11, 1995

[54] INSULATOR

[75] Inventor: Hiroyuki Ochi, Yokkaichi, Japan

[73] Assignee: Sumitomo Wiring Systems, Ltd., Mie, Japan

[21] Appl. No.: 149,236

[22] Filed: Nov. 9, 1993

[30] Foreign Application Priority Data

Nov. 9, 1992 [JP] Japan ............... 4-083635 U

[51] Int. Cl.⁶ ................................ H01R 4/18
[52] U.S. Cl. ................. 174/74 A; 174/74 R; 174/84 S; 174/138 F
[58] Field of Search ............ 174/74 A, 74 R:84 R, 174/84 S, 138 F

[56] References Cited

U.S. PATENT DOCUMENTS

| | | |
|---|---|---|
| 1,965,151 | 7/1934 | Mueller . |
| 2,977,403 | 3/1961 | Reitz ............................... 174/84 S |
| 3,430,185 | 2/1969 | Sitzer et al. ..................... 174/138 F |
| 3,441,661 | 4/1969 | Brummans ....................... 174/138 F |
| 3,821,464 | 6/1974 | Connan ............................ 174/138 F |
| 4,685,189 | 8/1987 | Palmqvist et al. ............... 174/74 A |
| 4,839,470 | 6/1989 | Ventura ............................ 174/84 R |
| 4,883,921 | 11/1989 | Legerius et al. ................ 174/84 S |

FOREIGN PATENT DOCUMENTS

| | | | |
|---|---|---|---|
| 557587 | 5/1958 | Canada ............................ 174/138 F |
| 1409873 | 7/1965 | France ............................. 174/74 A |
| 456232 | 2/1928 | Germany ......................... 174/74 R |
| 2645934 | 4/1978 | Germany ......................... 174/74 A |
| 2161995 | 6/1984 | United Kingdom ............. 174/74 A |

Primary Examiner—Morris H. Nimmo
Attorney, Agent, or Firm—Sughrue, Mion, Zinn, Macpeak & Seas

[57] ABSTRACT

An insulator (100) wherein a funnel portion (120) has a conical inner peripheral surface (121) of an inner diameter increasing in a direction away from a body (101). A male terminal (second terminal) (161) is inserted into the insulator (100) from the funnel portion (120) to mate with a female terminal (first terminal) (151) housed in the insulator (100), and a jig (170) is prevented from interfering with an edge of the funnel portion (120) of the insulator (100) as the male terminal (161) is securely pushed into the female terminal (151), thereby preventing connection failure between the first and second terminals. If the path of insertion of the male terminal (161) is shifted so that the male terminal (161) abuts against the inner peripheral surface (121), the path is corrected along the slope of the inner peripheral surface (121), facilitating the insertion of the male terminal (161).

5 Claims, 9 Drawing Sheets

INSULATOR

BACKGROUND OF THE INVENTION

1. Field of the Invention

The present invention relates to an insulator equipped adjacent a meter such as a speedometer or adjacent handlebars for an automotive two-wheeled vehicle and, more particularly, to an insulator for covering a terminal connecting part formed by connection between a first terminal attached to an end of a first wire and a second terminal attached to an end of a second wire for purposes of preventing a leak and for waterproofing.

2. Description of the Prior Art

Figure 9:
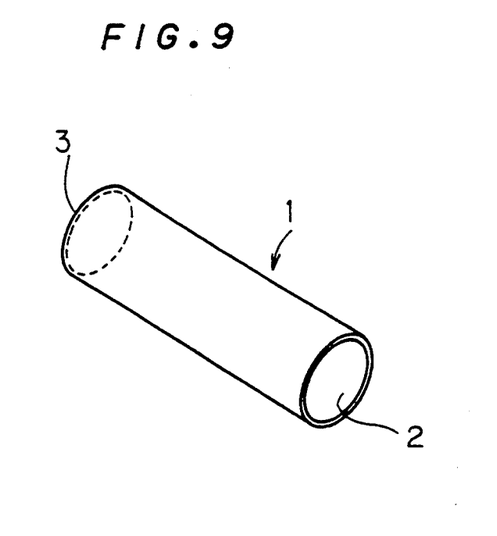
FIG. 9 is a perspective view of a prior art insulator.
Figure 10:
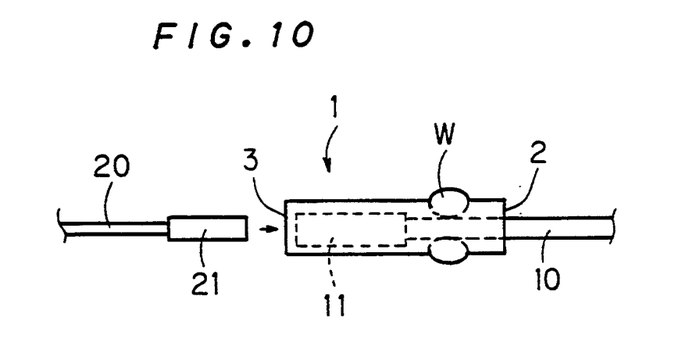
FIG. 10 is a sectional view for delineating the prior art insulator.

In general, many terminal connecting parts for wiring in electrical equipment of an automotive two-wheeled vehicle are exposed to the outside and adapted to be protected by insulators (caps) for purposes of preventing leaks and for waterproofing. Referring to FIGS. 9 and 10, for example, a tubular insulator 1 made of PVC (polyvinyl chloride) has a first opening 2 from which a female terminal 11 attached to an end of a wire 10 is inserted and positioned in the insulator 1. With the female terminal 11 positioned within the insulator 1, a weld W is formed by welding on the side of the first end of the insulator 1 to block up the first opening 2 and to fix the wire 10 to the insulator 1. A male terminal 21 attached to another wire 20 is inserted into the insulator 1 from its second opening 3 and is then connected to the female terminal 11.

For automotive two-wheeled vehicles, wires of small diameter with a thin coating have often been used for purposes of reduction in size and weight of the electrical equipment. Welding the insulator 1 to the wire 10 with the thin coating causes welding failure because of its small welding region, resulting in a large number of defective products.

For this reason, insulators which need no welding have been developed in recent years.

Figure 11:
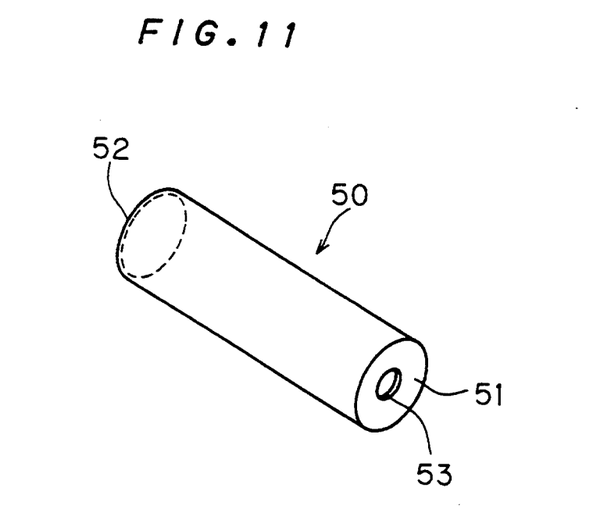
FIG. 11 is a perspective view of another prior art insulator.
Figure 12:
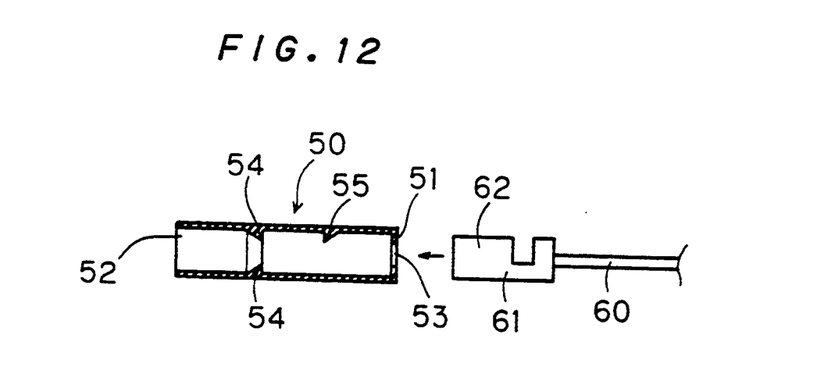
FIGS. 12 to 14 are sectional views for delineating the prior art insulator of FIG. 11.

FIGS. 11 and 12 illustrate such an insulator 50. The insulator 50 of a tubular configuration made of an elastic material such as PVC, as shown in FIGS. 11 and 12, has a block-up portion 51 for blocking up a first end thereof with a through hole 53 provided centrally therein for receiving terminals and wires, and locking portions 54 and 55 for terminal positioning formed so as to project inwardly from generally central locations on the inner peripheral surface of the insulator 50.

Figure 13:
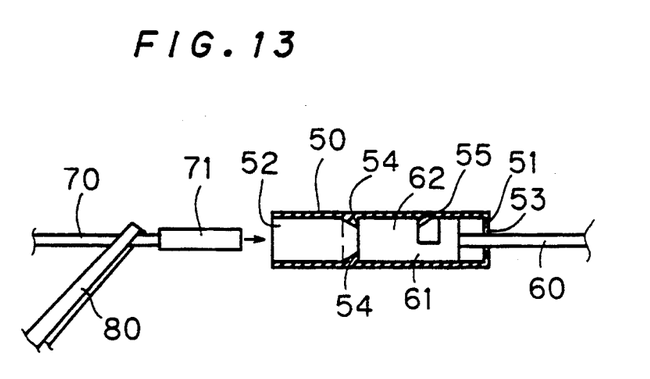

Referring to FIGS. 12 and 13, the through hole 53 is enlarged by means of a jig not shown or the like against the elastic force, and a female terminal 61 attached to an end of a wire 60 and the wire 60 are inserted into the enlarged through hole 53 and pushed in until a contact 62 provided at the front end of the female terminal 61 is fitted between the locking portions 54 and 55.

Figure 14:
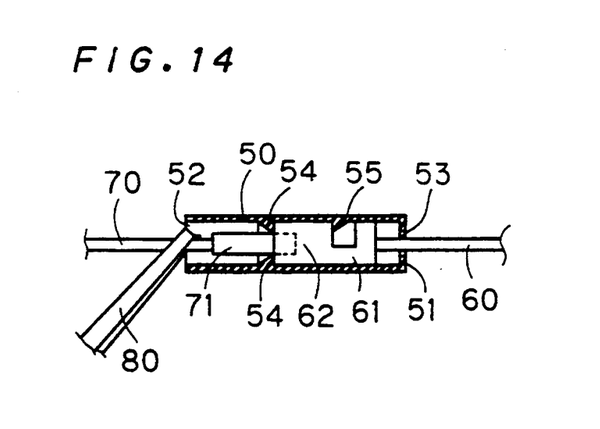

Then the through hole 53 is restored to its original diameter by the elastic restoring force to block up the first end of the insulator 50. A male terminal 71 attached to an end of a wire 70 and the wire 70 are inserted into the insulator 50 from its second opening 52 by means of a jig 80 and is then connected to the female terminal 61 within the insulator 50, as shown in FIG. 14.

A need exists, however, to prevent the wire 70 from bending when the male terminal 71 is connected to the female terminal 61 with the jig 80. It is, accordingly, necessary for the jig 80 to hold the wire 70 adjacent the male terminal 71. For this reason, the front end of the jig 80 must be inserted into the second opening 52 of the insulator 50 when the terminals 71 and 61 are connected to each other. A slight positional shift of the jig 80 in the diametrical direction of the insulator 50 causes the jig 80 to come into contact with the second end edge of the insulator 50, which hinders the male terminal 71 from being pushed into the female terminal 61. This results in connection failure between the terminals 71 and 61.

Further, the through hole 53 formed in the first end block-up portion 51 of the insulator 50 is as small as possible in diameter for purposes of preventing leak and preventing water from entering the inside of the insulator 50. This necessitates a jig for enlarging the through hole 53 widely enough for the female terminal 61 to pass therethrough when the female terminal 61 is fitted in the insulator 50, resulting in cumbersome insertion of the female terminal 61.

SUMMARY OF THE INVENTION

The present invention is intended for an insulator for covering a terminal connecting part formed by connection between a first terminal attached to an end of a first wire and a second terminal attached to an end of a second wire. According to the present invention, the insulator comprises: a tubular elastic body for housing the terminal connecting part; an elastic block-up portion for blocking up a first end of the body, the block-up portion having a through hole for receiving the first terminal and the first wire; and an elastic funnel portion formed in continuous relation with a second end of the body for receiving the second terminal and the second wire, the funnel portion having a conical inner peripheral surface of an inner diameter increasing in a direction away from the body.

In the insulator according to the present invention, the funnel portion having the conical inner peripheral surface of the inner diameter increasing in the direction away from the body is formed in continuous relation with the second end of the body. For connecting the second terminal to be inserted into the body from the funnel portion to the first terminal fitted in the body, the jig holding the second terminal or the second wire is prevented from contacting the edge of the funnel portion, and the second terminal is securely pushed into the first terminal, preventing the connection failure between the first and second terminals. Further, the inner peripheral surface of the funnel portion is conical. Thus, if the path of insertion of the second terminal is shifted so that the second terminal abuts against the inner peripheral surface of the funnel portion, the insertion path of the second terminal is corrected along the slope of the inner peripheral surface, thereby facilitating the insertion of the second terminal.

Preferably, the through hole includes a circular hole portion formed centrally of the block-up portion, and a first slit portion extending diametrically outwardly from a circumference of the circular hole portion.

In the insulator according to the present invention, the through hole formed in the block-up portion at the first end of the body of the insulator is comprised of the circular hole portion and the first slit portion extending diametrically outwardly from the circumference of the circular hole portion. The block-up portion is deflected adjacent the circular hole portion and first slit portion in such a manner as to be forced inwardly and the through hole is enlarged when the first terminal is pushed into the body from the through hole in order to insert the first terminal into the body. Thus, the first terminal is easily fitted into the insulator only by pushing the first terminal into the insulator from the through hole without any prior art jig for enlarging the through hole.

A primary object of the present invention is to provide an insulator which ensures connection between first and second terminals.

Another object of the present invention is to provide an insulator which enables a first terminal such as a female terminal to be easily inserted into an insulator body without a jig for enlarging a through hole when the first terminal is fitted therein.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
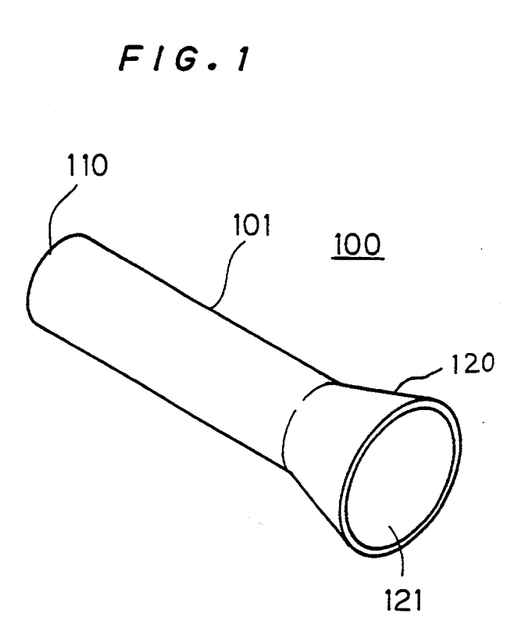
FIG. 1 is a perspective view of an insulator for a terminal connecting part according to a preferred embodiment of the present invention.
Figure 2:
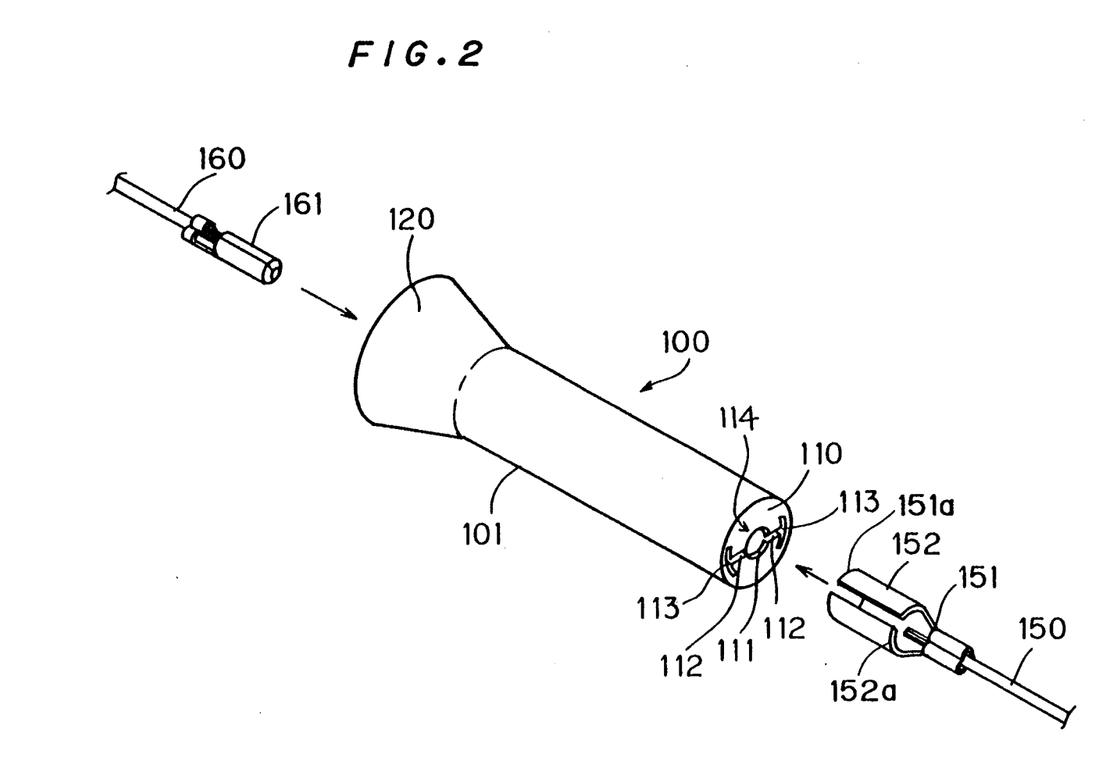
FIG. 2 is a perspective view of the insulator of the preferred embodiment.
Figure 3:
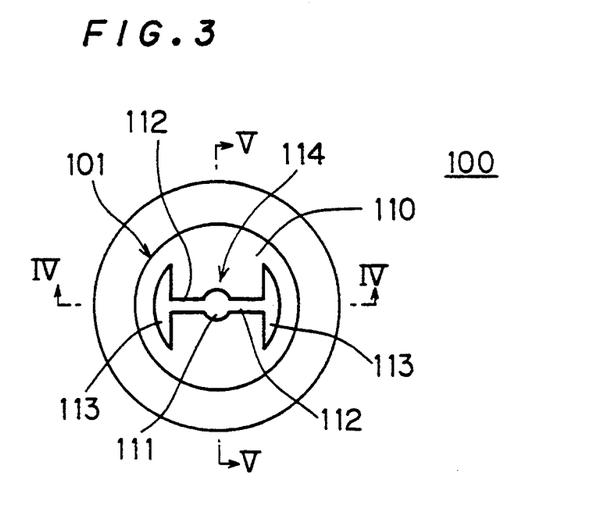
FIG. 3 is a front elevation of a first end of the insulator of the preferred embodiment.
Figure 4:
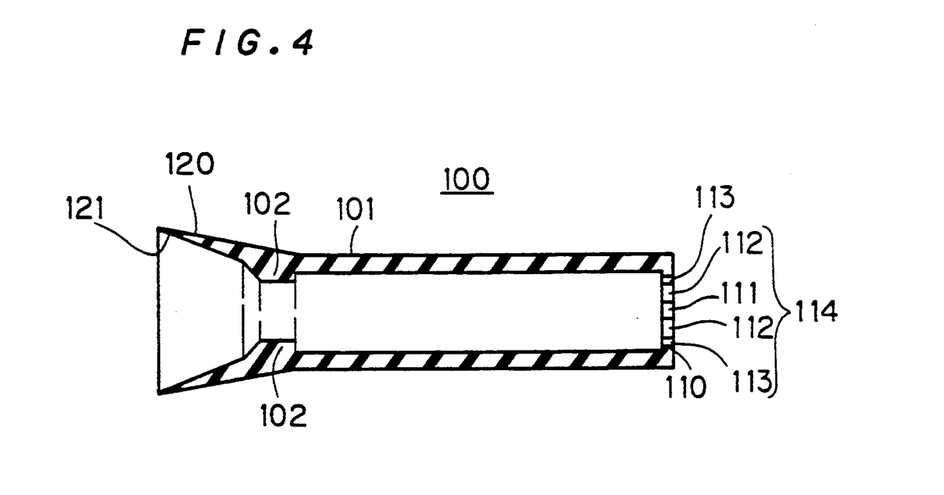
FIG. 4 is a sectional view taken along the line IV—IV of FIG. 3.
Figure 5:
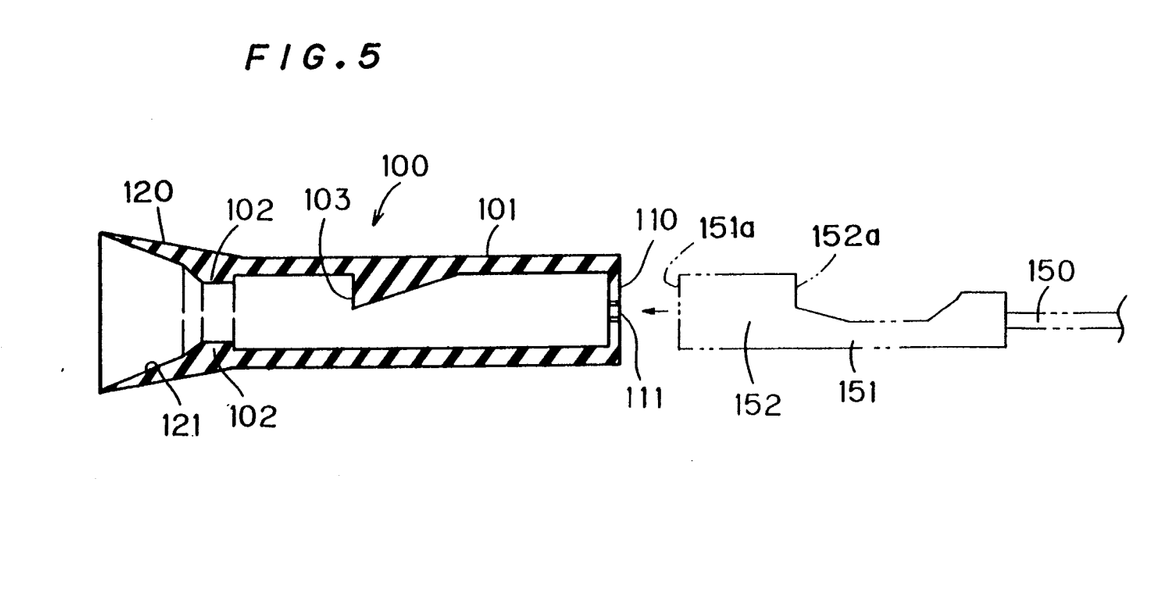
FIG. 5 is a sectional view taken along the line V—V of FIG. 3.

FIGS. 1 and 2 are perspective views of an insulator 100 according to a preferred embodiment of the present invention. FIG. 3 is a front elevation of a first end block-up portion of the insulator 100. FIG. 4 is a sectional view taken along the line IV—IV of FIG. 3, and FIG. 5 is a sectional view taken along the line V—V of FIG. 3. Referring to FIGS. 1 to 5, the insulator 100 made of a transparent elastic PVC material or the like comprises a tubular elastic body 101 for housing a terminal connecting part formed by connection between a first, female terminal 151 attached to an end of a first wire 150 and a second, male terminal 161 attached to an end of a second wire 160, a block-up portion 110 for blocking up a first end of the body 101, and a funnel portion 120 at a second end of the body 101. The block-up portion 110 is formed centrally with a through hole 114. The through hole 114 is comprised of a circular hole portion 111, a pair of first slit portions 112, and a pair of second slit portions 113. The circular hole portion 111 is formed generally centrally of the block-up portion 110. The first slit portions 112 extend diametrically outwardly from two circumferentially opposed positions of the circular hole portion 111, respectively. The second slit portions 113 are formed in continuous relation with the front ends of the first slit portions 112 and extend generally orthogonally to the first slit portions 112, respectively.

On the inner peripheral surface of the body 101 of the insulator 100 is formed a first locking portion in the form of a circumferential ledge 102 corresponding to the position of a first end 151a of a contact 152 of the female terminal (first terminal) 151 to be housed in the insulator 100, as shown in FIGS. 4 and 5. A second locking portion in the form of a positioning piece 103 protrudes inwardly from a position on the inner peripheral surface which is closer to the first end than the ledge 102 and generally in the middle of the body 101. The positioning piece 103 is engageable with a second end 152a of the contact 152 of the female terminal 151.

The funnel portion 120 is elastic and formed in continuous relation with the second end of the body 101 and has a conical inner peripheral surface 121 of an inner diameter increasing in a direction away from the body 101. The funnel portion 120 is designed such that its wall thickness decreases in the direction away from the body 101.

Figure 6:
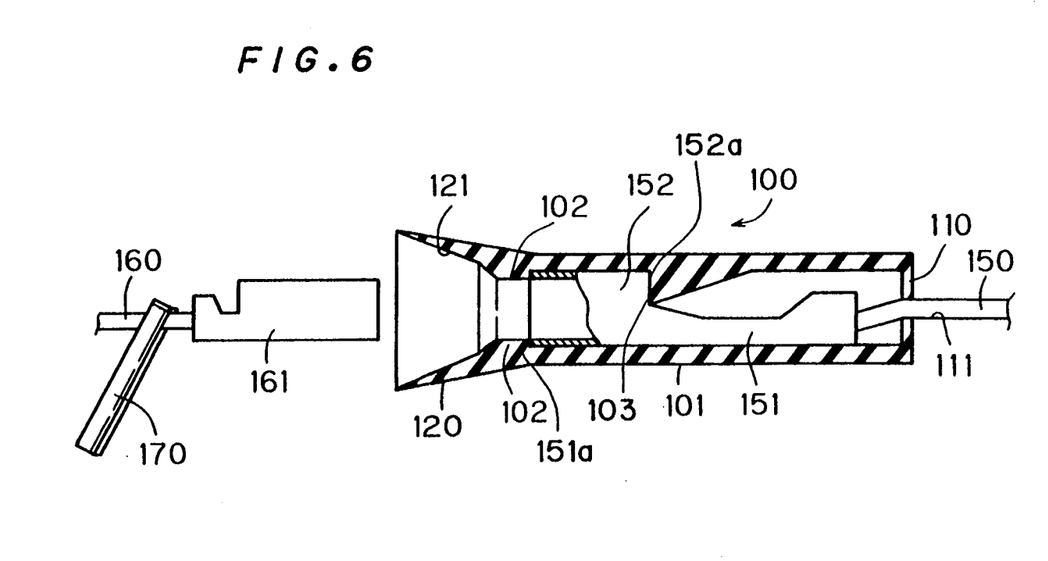
FIGS. 6 and 7 are sectional views for delineating the insulator of the preferred embodiment.

For fitting the female terminal 151 attached to an end of the first wire 150 into the foregoing insulator 100, the female terminal 151 is pushed into the insulator 100 from the through hole 114 of the block-up portion 110, as shown in FIGS. 5 and 6. Since the through hole 114 is formed with the circular hole portion 111, the first slit portions 112 continuous with the circular hole portion 111, and the second slit portions 113 continuous with the first slit portions 112, the block-up portion 110 is deflected adjacent the through hole 114 in such a manner as to be forced inwardly by pushing the female terminal 151 into the insulator 100. Consequently, the through hole 114 is enlarged. In this manner, the female terminal 151 is inserted into the insulator 100 through the through hole 114 enlarged as above described. As the female terminal 151 is further pushed in, the contact 152 passes the positioning piece 103 in such a manner as to push it upwardly. Then the first end 151a of the contact 152 engages the ledge 102, and the positioning piece 103 is elastically restored to engage the second end 152a of the contact 152. The female terminal 151 is housed and fixed within the insulator 100 in this manner.

As above described, the provision of the first slit portions 112 continuous with the circular hole portion 111 and the second slit portions 113 continuous with the first slit portion 112 enables the female terminal 151 to be easily fitted into the insulator 100 only by pushing it in without any prior art jig for enlarging the through hole.

It should be noted that, as the female terminal 151 is housed within the insulator 100, the peripheral edge of the through hole 114 of the block-up portion 110 is elastically restored to contact the first wire 150, as shown in FIG. 6. The through hole 114 is then blocked up.

Figure 7:
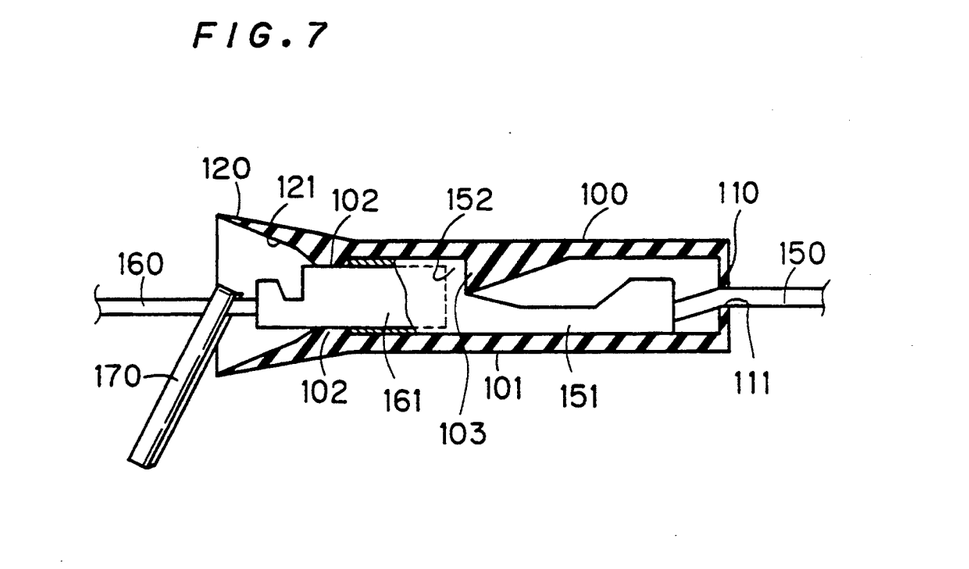

For connecting the male terminal (second terminal) 161 attached to an end of the second wire 160 to the female terminal 151 housed in the insulator 100, the male terminal 161 is inserted into the insulator 100 from the funnel portion 120, with the second wire 160 adjacent the male terminal 161 held by a jig 170 in a nipping manner, as shown in FIGS. 6 and 7. The funnel portion 120 is shaped such that the inner diameter thereof increases in the direction away from the body 101. Thus, if a slight position shift of the jig 170 occurs diametrically of the insulator 100, the front end of the jig 170 is prevented from contacting the second end of the insulator 100, and the male terminal 161 is securely pushed into the female terminal 151, thereby preventing connection failure between the terminals 151 and 161. Further, since the wall thickness of the funnel portion 120 is decreased in the direction away from the body 101, an edge of the funnel portion 120 could be easily deformed and the male terminal 161 could not be prevented from being pushed in even if the front end of the jig 170 came into contact with the edge of the funnel portion 120. This also prevents the connection failure between the terminals 151 and 161.

The inner peripheral surface 121 of the funnel portion 120 is of a conical configuration such that the diameter thereof increases in the direction away from the body 101. If the path of insertion of the male terminal 161 is shifted diametrically so that the male terminal 161 abuts against the inner peripheral surface 121, the insertion direction of the male terminal 161 is corrected along the slope of the inner peripheral surface 121, thereby facilitating the insertion of the male terminal 161.

Figure 8:
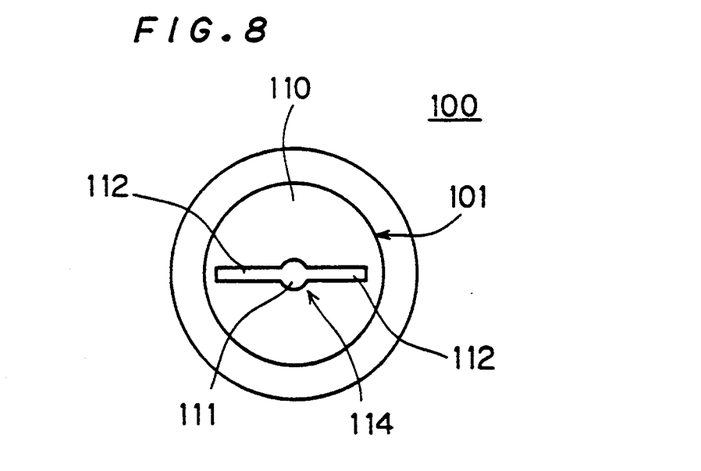
FIG. 8 is a front elevation of a first end of a variation of the insulator for the terminal connecting part according to the present invention.

Although the first and second slit portions 112 and 113 are formed in the block-up portion 110 in this preferred embodiment as shown in FIG. 3, the second slit portions 113 need not necessarily be formed. The block-up portion 110 may be formed with only the first slit portions 112 extending diametrically outwardly from the circumference of the circular hole portion 111, as shown in FIG. 8.

While the invention has been shown and described in detail, the foregoing description is in all aspects illustrative and not restrictive. It is therefore understood that numerous modifications and variations can be devised without departing from the scope of the invention.

What is claimed is:

1. An insulator for covering a terminal connecting part formed by connection between a first terminal attached to an end of a first wire and a second terminal attached to an end of a second wire, said insulator comprising:

a tubular elastic body for housing the terminal connecting part;

an elastic block-up portion for closing a first end of said body, said block-up portion having a through hole through which the first terminal and the first wire are inserted; and an elastic funnel portion formed in continuous relation with a second end of said body through which the second terminal and the second wire are inserted, said funnel portion having a conical inner peripheral surface and an inner diameter increasing in a direction away from said body for facilitating insertion of the second terminal and the second wire through said funnel portion for connection with the first terminal and the first wire in said tubular elastic body.

2. The insulator of claim 1, wherein
said funnel portion has a wall thickness which decreases in the direction away from said body.

3. The insulator of claim 1, wherein
the first terminal has a contact at a front end thereof, and wherein
said body comprises a first locking portion protruding circumferentially from an inner peripheral surface of said body at the second end of said body for locking a first end of said contact, and a second locking portion protruding from a generally central position of the inner peripheral surface of said body for locking a second end of said contact.

4. The insulator of claim 1, wherein
the through hole comprises a circular hole portion formed centrally of said block-up portion, and a first slit portion extending diametrically outwardly from a circumference of said circular hole portion.

5. The insulator of claim 4, wherein
the through hole further comprises a second slit portion formed in continuous relation with an end of said first slit portion and extending orthogonally to said first slit portion.

* * * * *